United States Patent
Agirman et al.

(10) Patent No.: US 6,459,599 B1
(45) Date of Patent: Oct. 1, 2002

(54) DETERMINING PHASE OF AC MAINS IN PWM CONTROLLED CONVERTERS WITHOUT VOLTAGE SENSORS

(75) Inventors: Ismail Agirman, Hartford, CT (US); Vladimir Blasko, Avon, CT (US); Christopher S. Czerwinski, Farmington, CT (US); Jeffrey M. Izard, Bolton, CT (US); Edward D. Piedra, Chicopee, MA (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/872,681

(22) Filed: Jun. 1, 2001

(51) Int. Cl.⁷ .................................................. H02M 7/04
(52) U.S. Cl. ........................ 363/84; 363/125; 363/129
(58) Field of Search .............................. 363/17, 24, 25, 363/26, 39, 40, 41, 84, 98, 131, 132, 44, 85, 89, 125, 129

(56) References Cited

U.S. PATENT DOCUMENTS 4,367,522 A * 1/1983 Forstbauer et al. ......... 363/137
5,198,746 A * 3/1993 Gyugyi et al. ................ 363/39
5,703,771 A * 12/1997 Wong et al. ................. 363/134

* cited by examiner

Primary Examiner—Jessica Han

(57) ABSTRACT

In a pulse width modulation-controlled, switched bridge, DC converter, the phase angle (44, 45) of the AC mains (4) is provided without sensing the voltage thereof, by a phase-locked loop (47) having one input (75) derived (126) from the in-phase voltage command $V_{de}{}^*$ (61) and another $f_{init}$ (77) approximating the line frequency; the phase-locked loop is initialized at a phase angle $\theta_{init}$(76) equal to the arctangent (124) of the in-phase $V_d{}^{est}$, and quadrature $V_q{}^{est}$ representation of estimated line voltages $e_{re}$, $e_{se}$, $e_{te}$ (119–121) derived during an initialization cycle from reconstruction of the fundamental component of the AC main currents at a phase angle (93) changing with said frequency. Reconstruction includes providing the discrete Fourier transform (DFT, 81) of signals indicative of currents (37) in the AC mains and the inverse DFT (122) of the resultant Fourier coefficients $e_{ia}$, $e_{ib}$.

4 Claims, 2 Drawing Sheets

DETERMINING PHASE OF AC MAINS IN PWM CONTROLLED CONVERTERS WITHOUT VOLTAGE SENSORS

TECHNICAL FIELD

This invention relates to provision of the phase angle of voltage on AC mains for use in a conventional pulse width modulation-controlled voltage source converter employing an insulated gate bipolar transistor (IGBT) bridge, without measuring the voltage of the mains, utilizing signals indicative of the currents in the mains.

BACKGROUND ART

Regenerative drives in elevators are attractive since they can transfer energy stored in an overrunning elevator (the elevator load driving the motor) back to the building power supply, resulting in increased energy efficiency and reduced operating costs for the building owner. Proper operation of a regenerative drive requires knowledge of the phase angle of the AC power supply in order to control the energy flow to/from the power supply. Historically, the phase angle has been determined by measuring each of the three power supply phase voltages using a sensing circuit that is typically comprised of high-voltage resistors and isolation amplifiers. The resulting signals are then sent to a microprocessor where the phase angle is calculated.

There are several disadvantages to this approach for determining the phase angle. System cost is increased due to the additional required components, particularly due to the isolation amplifiers that are expensive. Component size is increased due to additional space required on printed circuit boards, which is significant when complying with the regulatory code spacing requirements for high-voltage. Reliability is decreased due to the increased number of components, especially due to high-voltage resistors that historically exhibit manufacturing reliability deficiencies. Complexity is increased due to additional wiring required in the drive from the AC power supply to the printed circuit board, which is prone to manufacturing error.

DISCLOSURE OF INVENTION

Objects of the invention include: improved voltage source converters; determining the phase angle of a power source without using voltage sensors; elimination of components and reduced system cost; reduced component size and smaller printed circuit boards; elimination of high voltage spacing requirements; increased reliability and elimination of components that are historically prone to manufacturing reliability deficiencies; and simplified design, reduced manufacturing error and reduction of wiring in voltage source converters.

According to the invention, the phase angle of an AC power source is determined without measuring the AC power source phase voltages, thus eliminating voltage sensing circuits. A short initialization is performed periodically, such as at the beginning of every elevator run, in which the regenerative converter of the drive is energized and de-energized for very short periods of time, during which the current flow through each of the three input phases to the drive are monitored; these current measurements are also used for conventional current feedback in control of the converter. The pulses continue for at least one full cycle of the AC power supply, typically on the order of 16–20 milliseconds. A mathematical algorithm calculates the phase angle of the AC line, which is used to initialize a conventional phase locked loop, which tracks the phase of the line, in the usual fashion, in subsequent operation of the converter; a voltage derived from the commanded in-phase voltage in synchronous coordinates (used to generate the ultimate voltage commands) provides the voltage input to the phase-locked loop.

Although the invention is described with respect to a drive for an elevator system as an exemplary embodiment, the invention may be utilized in drives for any other applicable utilization.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
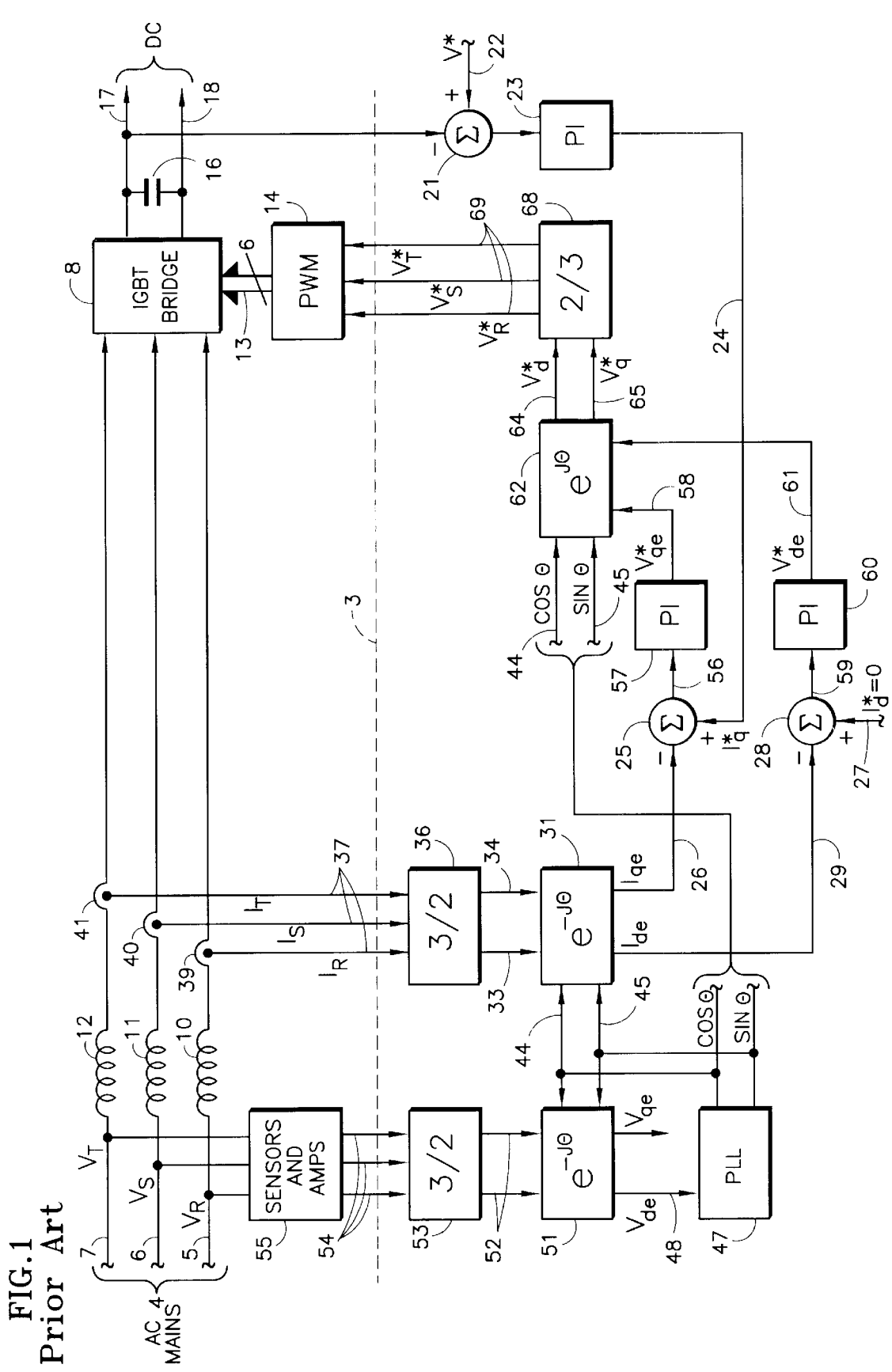
FIG. 1 is a functional block diagram of a pulse width modulation-controlled converter, known to the prior art, and employing voltage sensors and amplifiers.
Figure 2:
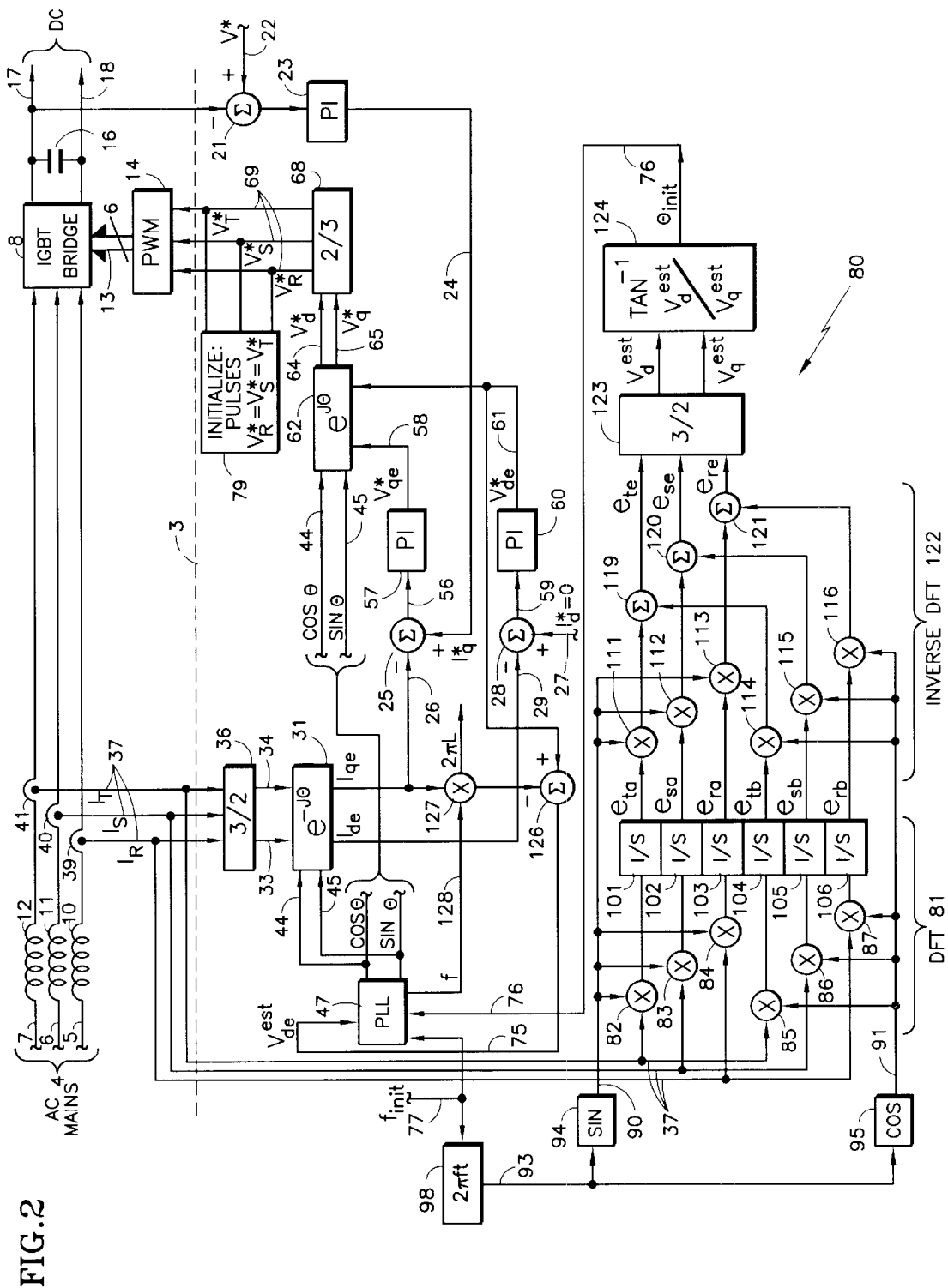
FIG. 2 is a functional block diagram of a pulse width modulation-controlled converter of the invention, which eliminates the use of voltage sensors and signal conditioning amplifiers.

In FIGS. 1 and 2, the functions illustrated above the dotted line 3 are provided by hardware, whereas the functions illustrated below the dotted line 3 are provided by software, as is conventional.

Referring to FIG. 1, the AC mains 4 include R, S and T phases 5–7 as is known. The AC mains 4 are applied through line inductors 10–12 to a conventional insulated gate bipolar transistor bridge 8, which receives six different switching signals over lines 13 from a conventional pulse width modulation controller 14. The bridge 8 provides regulated DC voltage to a power capacitor 16 and a pair of output lines 17, 18.

A signal indicative of the DC voltage of the line 17 is applied to a negative input of a summing function 21, the positive input of which is the desired or commanded voltage V* on a line 22. In an elevator system, this command is provided by the motion controller; in other systems, other commands may be used. The difference is applied to a proportional and integral controller 23 which provides a quadrature current command component on a line 24, $I_q{}^*$, which is compared in a summing function with the quadrature component, in synchronous coordinates, of actual line current being provided to the bridge 8, $I_{qe}$ on a line 26. An in-phase current command component on a line 27, $I_d{}^*$, is usually set to zero in order to provide unity power factor; it is compared in a summing function 28 with the in-phase component, in synchronous coordinates, of the actual line current provided to the bridge 8, $I_{de}$, on a line 29. The signals on the lines 26, 29 are provided by a conventional coordinate conversion function 31 which converts in-phase and quadrature current signals in stationary coordinates on lines 33, 34 to synchronous coordinates. The signals on the lines 33, 34 are provided by a conventional three-to-two conversion function 36 in response to signals on lines 37 representing the magnitude of the currents, $I_R$, $I_S$, $I_T$, in the corresponding AC mains, 5–7 which are provided by current sensors 39–41.

The stationary coordinate to synchronous coordinate conversion function 31 responds to signals on lines 44, 45 indicative of the cosine and sine, respectively, of the phase angle, θ, of one of the incoming lines, provided by a phased locked loop 47. In the prior art, the phase locked loop 47 is driven by a signal, $V_{de}$, on a line 48 which is provided by a stationary-to-synchronous conversion function 51, in turn responsive to a pair of inputs on lines 52 from a three-to-two conversion function 53. The inputs are signals on three lines 54 indicative of the magnitude voltage of the AC mains 5–7, which is provided by sensors and amplifiers 55, that, as described hereinbefore are expensive, take up additional space, and impose undesirable constraints on component spacing. Thus, the voltage sensors and amplifiers 5 are needed, along with the functions 51 and 53, simply to provide the voltage signal, $V_{de}$, as an input to the phase locked loop 47, so as to provide the cosine and sine of the phase of the AC main. It is elimination of the sensors and amplifiers 55 to which the present invention is directed.

The output of the summer function on line 56 is the current command error signal, being the difference between the desired current, $I_q^*$, and the actual quadrature current, $I_{qe}$. This error signal is passed through a proportional and integral controller 57 to provide a quadrature voltage command signal in synchronous coordinates, $V_{qe}^*$, on a line 58. In a similar fashion, the output of the summer 28 on a line 59 is the error between the desired in-phase current, $I_d^*$, and the actual in-phase current in synchronous coordinates, $I_{de}$. This is applied to a proportional and integral controller 60 so as to provide an in-phase voltage command in synchronous coordinates, $V_{de}^*$, on a line 61.

In FIG. 1, the cosine and sine signals on the lines 44, 45 are applied to a synchronous-to-stationary conversion function 62, to convert the in-phase and quadrature voltage commands in synchronous coordinates on line 58 and 61, to in-phase and quadrature voltage commands, in stationary coordinates $V_d^*$, $V_q^*$, on lines 64, 65. These are applied to a conventional two to three conversion function 68, the output of which on three lines 69 comprise three-phase voltage command signals, $V_R^*$, $V_S^*$, $V_T^*$ which are applied to the pulse width modulation controller 14. The pulse width modulation controller provides signals over six lines 13 in order to provide the switching signals for the bridge 8, as is conventional. The description thus far is of a conventional pulse width modulation-controlled, voltage source converter.

Referring to FIG. 2, the phase locked loop 47 no longer responds to signals derived from the voltage sensors and amplifiers 55 of FIG. 1. Instead, the input to the phase locked loop 47 is an estimated in-phase voltage in synchronous coordinates, $V_{de}^{*est}$, on a line 75, which is derived from the in-phase voltage command in synchronous coordinates, $V_{de}^*$, on a line 61, in a manner to be described hereinafter. In addition, the phase locked loop is initiated at an estimated phase angle of the AC mains, $\theta_{init}$, provided on a line 76 and the frequency is initialized to $f_{init}$, provided on line 77, which is set to a suitable frequency: in an elevator control used around the world, f may conveniently be set to 55 Hertz since the system will thereafter stabilize at the frequency of the AC mains 4, either 60 Hertz (in the U.S.) or 50 Hertz (elsewhere). The initial phase angle on line 76 is created during an initialization cycle of operation in which pulses of currents within the bridge 8 are caused by periodically causing the inputs on lines 69 to the pulse width modulation controller 14 to be equal: that is, for very short periods of time, on the order of 30 microseconds, $V_R^*=V_S^*=V_T^*$, as caused by an initialize function 79. During this initial period, a phase estimator 80 creates the estimated initial phase signal on the line 76.

The signals on lines 37, indicative of the magnitude of current flowing into the bridge 8, are provided to a discrete Fourier transform (DFT) function 81, including two groups of multiplier functions 82–84, 85–87, the other inputs of which are respectively the sine and cosine on lines 90, 91, of an angle φ on a line 93, provided by sine and cosine functions 94, 95. The angle φ is created by a function 98 which generates it as 2 πft in a function 98, with f being set to $f_{init}$. The output of each multiplication function 82–87 is applied to a corresponding integral function 101–106, the outputs of which are the first-harmonic Fourier coefficients of the estimated line voltages $e_{ia}$, $e_{ib}$, where i equals r, s, t. These Fourier coefficients are multiplied by the sine and cosine respectively, of the initialization angle, φ, in corresponding multiplier functions 111–116, the outputs of which are summed in summing functions 119–121 to produce estimated line voltages of the AC mains, $e_{ie}$, at the fundamental frequency. The multiplier functions 111–116 and summer functions 119–121 comprise an inverse discrete Fourier transform 122. The DFT 81 and inverse DFT 122 reconstruct the fundamental component of the AC mains; there are other ways known in the art to do so, and which may be utilized if desired.

The estimated line voltages are applied to a conventional three-to-two conversion function to provide in-phase and quadrature estimated line voltages, $V_d^{est}$, $V_q^{est}$. The arctangent 124 of the ratio of the in-phase and quadrature estimated voltages provides the initial phase angle, $\theta_{init}$, on the line 76. At the end of about one full cycle of the initialization frequency (function 98), the initial phase angle on line 76 is used to initialize the phase of the phase-locked loop 47.

A second aspect of the present invention is providing an estimated in-phase voltage in synchronous coordinates $V_{de}^{est}$ on the line 75, as a substitute for the signal generated in the prior art in response to AC main voltages. This is derived from a summing function 126, which subtracts the reactive voltage drop of the AC mains, $2\pi fLI_{qe}$, from the in-phase voltage command in synchronous coordinates, $V_{de}^*$. The frequency, f, as an input to the multiplication function 127 is derived from the phase-locked loop on line 128.

During the initialization cycle, and thereafter, the conventional functions of FIG. 2, those described with respect to FIG. 1, are performed, so that the controller is fully operational at the end of the initialization cycle.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of providing control signals to solid state switches of a bridge in a pulse-width-modulation-controlled DC converter, which method comprises:
   providing a sine signal indicative of the sine of an angle θ;
   providing a cosine signal indicative of the cosine of said angle θ;
   providing line current signals, each respectively indicative of the magnitude of current flowing between said bridge and a corresponding one of said AC mains;
   providing, in response to (a) said line current signals and (b) said sine and cosine signals, in-phase and quadrature line current signals in synchronous coordinates;
   providing a DC voltage command signal;

providing a voltage error signal in response to the difference between said DC voltage command signal and the DC output voltage of said bridge;

providing a quadrature current command signal in response to said voltage error signal;

providing a quadrature current error signal in response to said quadrature current command signal minus said quadrature line current signal in synchronous coordinates;

providing a quadrature voltage command signal in synchronous coordinates in response to said quadrature current error signal;

providing an in-phase current command signal selected to provide desired zero state vectors;

providing an in-phase current error signal in response to said in-phase current command signal minus said in-phase line current signal in synchronous coordinates;

providing an in-phase voltage command signal in synchronous coordinates in response to said in-phase current error signal;

providing three-phase voltage command signals, one corresponding to each of said AC mains in response (c) to said in-phase and quadrature voltage command signals in synchronous coordinates and (d) to said sine and cosine signals;

providing pulse width modulation control signals for the switches of said bridge in response to said three-phase voltage command signals, thereby to provide said DC output voltage in correspondence with said DC voltage command signal;

characterized by the improvement comprising:

providing an estimated voltage signal derived from said in-phase voltage command signal in synchronous coordinates as in input to a phase lock loop function which provides said sine and cosine signals;

during an initialization cycle of operation providing an angle signal indicative of the phase angle that changes with a frequency on the order of the frequency of the AC mains;

providing six Fourier signals in response to the discrete Fourier transform of said line current signals at the phase angle represented by said angle signal;

providing estimated line voltage signals as the inverse discrete Fourier transform of said six Fourier signals at the phase angle represented by said angle signal;

providing estimated in-phase and quadrature line voltage signals in response to said estimated line voltage signals;

providing an estimated initialization phase angle signal as the arctangent of the ratio of said estimated in-phase line voltage signal to said estimated quadrature line voltage signal; and at the end of said initialization cycle, initializing said phase lock loop function with said estimated initialization angle signal.

2. A method according to claim 1 wherein said step of providing said estimated voltage signal comprises:

providing said estimated voltage signal as said in-phase voltage signal in synchronous coordinates minus the inductive reactive voltage drop of said AC mains.

3. A method of controlling a pulse-width-modulation-controlled, switched bridge, DC converter, characterized by:

providing the phase angle of the AC mains in response to a phase-locked loop function having an input derived from an in-phase voltage command in synchronous coordinates and initialized at an angle comprising the arctangent of estimated in-phase and quadrature line voltages derived during an initialization cycle from reconstruction of the fundamental component of the AC main currents to said bridge at a phase angle changing at a frequency on the order of the frequency of said AC mains.

4. A method according to claim 3 wherein said reconstruction of the fundamental component of the AC main currents comprises:

providing first harmonic Fourier coefficients of the estimated line voltages of the AC mains; and providing the inverse discrete Fourier transform of said Fourier coefficients.

* * * * *